United States Patent
Bansal

(10) Patent No.: US 8,302,079 B2
(45) Date of Patent: *Oct. 30, 2012

(54) PROGRAMMATIC ROOT CAUSE ANALYSIS FOR APPLICATION PERFORMANCE MANAGEMENT

(75) Inventor: Jyoti K Bansal, San Francisco, CA (US)

(73) Assignee: CA, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/232,735

(22) Filed: Sep. 14, 2011

(65) Prior Publication Data

US 2012/0005658 A1    Jan. 5, 2012

Related U.S. Application Data

(63) Continuation of application No. 11/758,232, filed on Jun. 5, 2007, now Pat. No. 8,032,867.

(51) Int. Cl.
G06F 9/44 (2006.01)
(52) U.S. Cl. ........................ 717/127; 717/128
(58) Field of Classification Search .................. 717/127, 717/128

See application file for complete search history.

(56) References Cited

U.S. PATENT DOCUMENTS

| | | | |
|---|---|---|---|
| 5,958,009 A | 9/1999 | Friedrich et al. | |
| 6,141,699 A | 10/2000 | Luzzi et al. | |
| 6,182,022 B1 | 1/2001 | Mayle et al. | |
| 6,327,677 B1 | 12/2001 | Garg et al. | |
| 6,738,933 B2 | 5/2004 | Fraenkel et al. | |
| 7,050,936 B2 | 5/2006 | Levy et al. | |
| 7,076,695 B2 | 7/2006 | McGee et al. | |
| 7,197,559 B2 * | 3/2007 | Goldstein et al. | 709/224 |
| 7,280,988 B2 | 10/2007 | Helsper et al. | |
| 7,286,962 B2 | 10/2007 | Di Palma et al. | |
| 7,310,590 B1 | 12/2007 | Bansal | |
| 7,467,067 B2 | 12/2008 | Marvasti | |
| 7,673,191 B2 | 3/2010 | Addleman et al. | |
| 7,676,706 B2 | 3/2010 | Addleman et al. | |
| 7,698,686 B2 | 4/2010 | Carroll et al. | |
| 7,818,246 B2 * | 10/2010 | Cushing et al. | 705/37 |
| 8,032,867 B2 | 10/2011 | Bansal | |
| 2002/0174421 A1 | 11/2002 | Zhao et al. | |
| 2004/0078691 A1 | 4/2004 | Cirne et al. | |
| 2004/0088406 A1 | 5/2004 | Corley et al. | |
| 2004/0163079 A1 | 8/2004 | Noy et al. | |
| 2005/0065753 A1 | 3/2005 | Bigus et al. | |
| 2006/0156072 A1 | 7/2006 | Khot et al. | |
| 2006/0173878 A1 | 8/2006 | Bley | |
| 2007/0067678 A1 | 3/2007 | Hosek et al. | |

* cited by examiner

*Primary Examiner* — Anna Deng
(74) *Attorney, Agent, or Firm* — Vierra Magen Marcus & DeNiro LLP

(57) ABSTRACT

Programmatic root cause analysis of application performance problems is provided in accordance with various embodiments. Transactions having multiple components can be monitored to determine if they are exceeding a threshold for their execution time. Monitoring the transactions can include instrumenting one or more applications to gather component level information. For transactions exceeding a threshold, the data collected for the individual components can be analyzed to automatically diagnose the potential cause of the performance problem. Time-series analytical techniques are employed to determine normal values for transaction and component execution times. The values can be dynamic or static. Deviations from these normal values can be detected and reported as a possible cause. Other filters in addition to or in place of execution times for transactions and components can also be used.

18 Claims, 9 Drawing Sheets

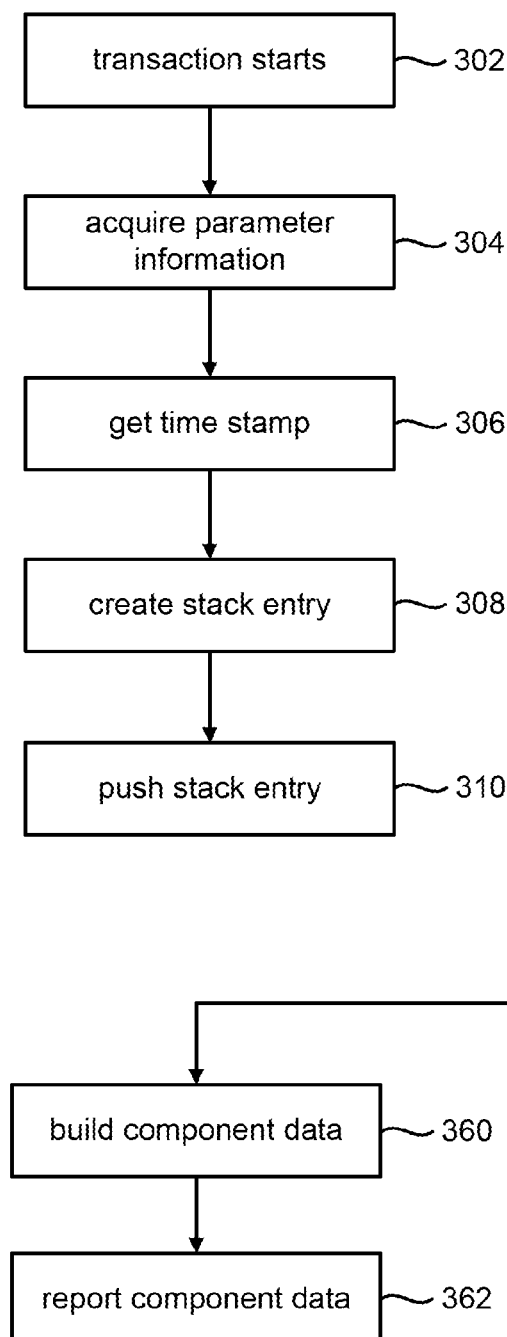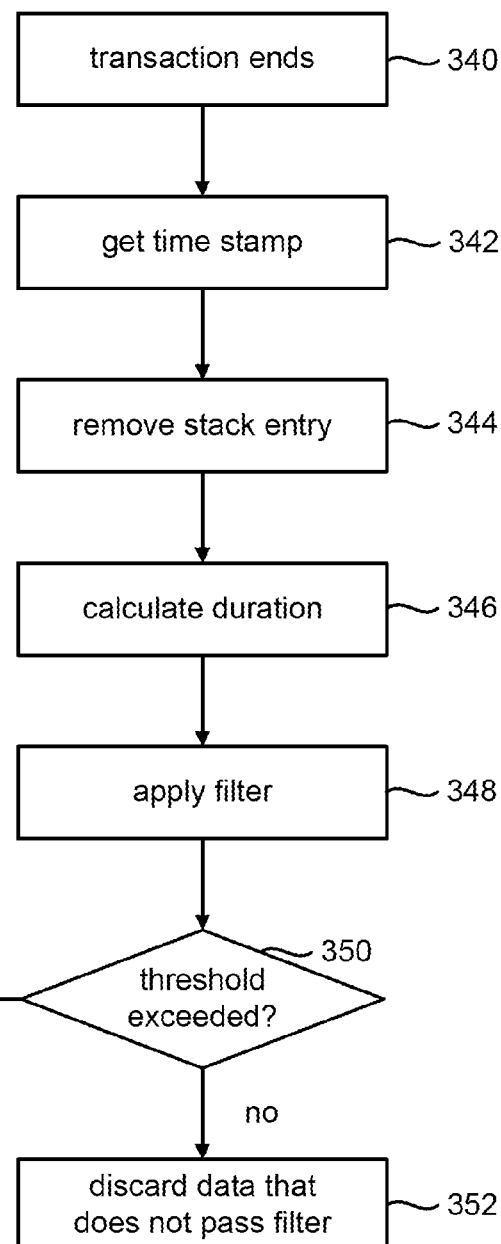

Fig. 8

| TASK (Component Type) | trans 1 | trans2 | trans3 | trans4 | normal | threshold |
|---|---|---|---|---|---|---|
| JSP\|Account (ms) | 3825 | 3750 | 3900 | 3875 | 3800 | 75 |
| Servlet\|CustomerLookup (ms) | 3450 | 3450 | 3500 | 3440 | 3500 | 50 |
| EJB\|Entity\|Customer (ms) | 2225 | 2180 | 2170 | 2220 | 2200 | 50 |
| EJB\|Session\|Account (ms) | 990 | 1000 | 1025 | 1030 | 1000 | 50 |
| JDBC\|Oracle\|Query (ms) | 755 | 760 | 740 | 735 | 750 | 20 |
| JDBC\|Oracle\|Update (ms) | 1310 | 1320 | 1330 | 1350 | 1300 | 50 |
| JDBC\|Oracle\|Query (ms) | 700 | 720 | 710 | 700 | 700 | 15 |
| total transaction time (ms) | 13255 | 13180 | 13375 | 13350 | 13250 | 140 |

Fig. 9

| System | trans 1 | trans2 | trans3 | trans4 | normal | threshold |
|---|---|---|---|---|---|---|
| Browser (ms) | 9.8 | 10.2 | 9.9 | 9.9 | 10 | 0.3 |
| Network (ms) | 99.8 | 101.0 | 99.0 | 100.0 | 100 | 3.0 |
| Web Server (ms) | 9.9 | 10.1 | 10.1 | 10.1 | 10 | 0.2 |
| Identity Server (ms) | 19.8 | 19.8 | 20.2 | 199.0 | 200 | 5.0 |
| Web Server (ms) | 10.1 | 10.1 | 9.8 | 10.1 | 10 | 0.3 |
| Application Server (ms) | 51.0 | 49.0 | 49.0 | 50.1 | 50 | 2.0 |
| Database Server (ms) | 98.0 | 99.0 | 106.0 | 98.9 | 100 | 5.0 |
| Application Server (ms) | 49.5 | 50.5 | 49.5 | 50.0 | 50 | 1.0 |
| Messaging Server (ms) | 101.0 | 101.0 | 100.5 | 101.0 | 100 | 2.0 |
| Application Server (ms) | 21.0 | 19.8 | 19.0 | 20.0 | 20 | 0.7 |
| CICS Server (ms) | 200.0 | 200.0 | 198.0 | 199.0 | 200 | 4.0 |
| Application Server (ms) | 29.5 | 30.1 | 30.1 | 30.1 | 30 | 0.6 |
| Web Server (ms) | 10.1 | 10.1 | 10.1 | 10.1 | 10 | 0.2 |
| Network (ms) | 99.8 | 100.5 | 99.5 | 99.8 | 100 | 1.0 |
| Browser (ms) | 10.3 | 9.9 | 10.1 | 10.1 | 10 | 0.2 |
| total transaction time (ms) | 997.8 | 999.3 | 1002.6 | 998.1 | 1000 | 2.5 |

Fig. 10

| TASK | trans 1 | trans2 | trans3 | trans4 | normal | threshold |
|---|---|---|---|---|---|---|
| Browser (%) | 2.0 | 2.1 | 2.2 | 2.0 | 2.0 | 0.2 |
| Network (%) | 20.0 | 21.0 | 19.5 | 23.0 | 20.0 | 2.0 |
| Web Server (%) | 3.0 | 3.4 | 3.1 | 3.0 | 3.0 | 0.4 |
| Identity Server (%) | 20.0 | 18.5 | 19.5 | 21.0 | 20.0 | 2.0 |
| Application Server (%) | 15.0 | 16.5 | 17.0 | 16.0 | 15.0 | 1.5 |
| Database Server (%) | 10.0 | 10.5 | 9.5 | 10.5 | 10.0 | 1.0 |
| Messaging Server (%) | 10.0 | 9.5 | 9.5 | 10.5 | 10.0 | 1.0 |
| total transaction time (ms) | 1000 | 1001 | 1003 | 1003 | 1000 | 2.5 |

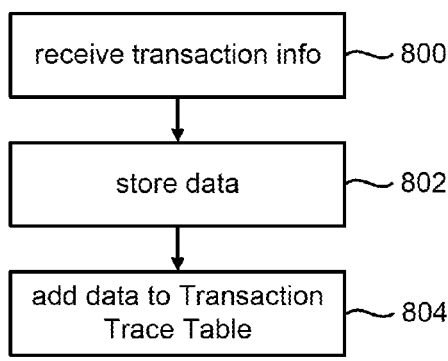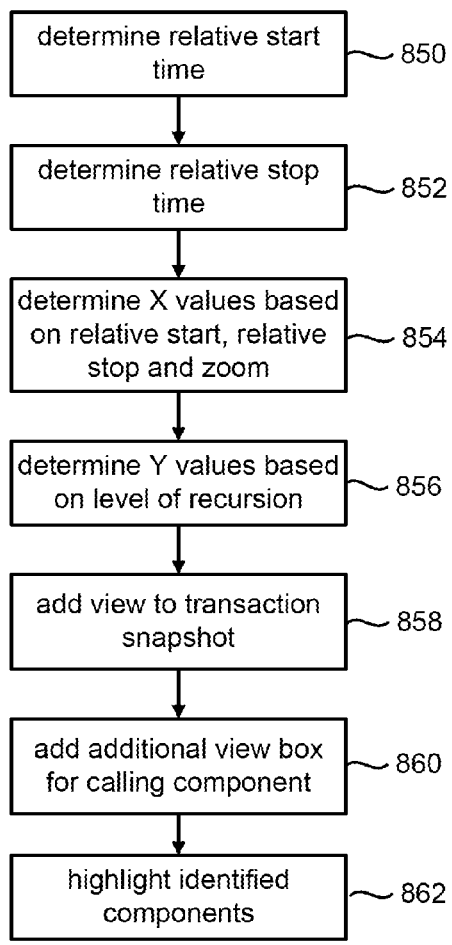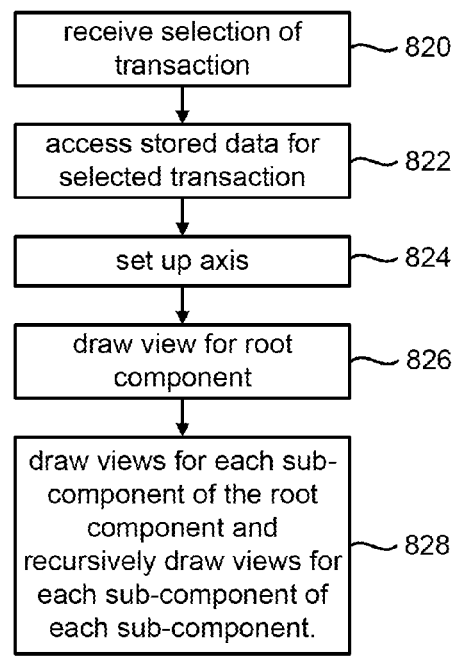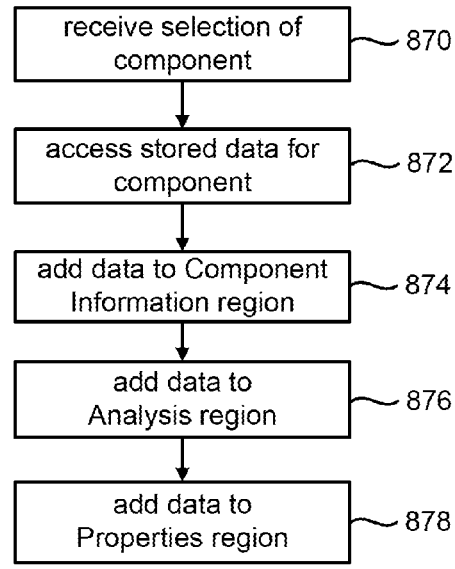

PROGRAMMATIC ROOT CAUSE ANALYSIS FOR APPLICATION PERFORMANCE MANAGEMENT

CLAIM OF PRIORITY

This application is a continuation application of U.S. patent application Ser. No. 11/758,232 (now U.S. Pat. No. 8,032,867), entitled "PROGRAMMATIC ROOT CAUSE ANALYSIS FOR APPLICATION PERFORMANCE MANAGEMENT," by Jyoti Kumar Bansal, filed Jun. 5, 2007, which is incorporated by reference herein in its entirety.

BACKGROUND OF THE INVENTION

1. Field of the Invention

Embodiments of the present disclosure are directed to application performance management.

2. Description of the Related Art

Maintaining and improving application performance is an integral part of success for many of today's institutions. Businesses and other entities progressively rely on increased numbers of software applications for day to day operations. Consider a business having a presence on the World Wide Web. Typically, such a business will provide one or more web sites that run one or more web-based applications. A disadvantage of conducting business via the Internet in this manner is the reliance on software and hardware infrastructures for handling business transactions. If a web site goes down, becomes unresponsive or otherwise fails to properly serve customers, the business may lose potential sales and/or customers. Intranets and Extranets pose similar concerns for these businesses. Thus, there exists a need to monitor web-based, and other applications, to ensure they are performing properly or according to expectation.

For many application developers, a particular area of concern in these types of environments is transaction time. Longer transaction times may correlate directly to fewer transactions and thus, lost sales, etc. It may be expected that a particular task that forms part of a type of transaction may take a fraction of a second to complete its function(s). The task may execute for longer than expected for one or more transactions due to a problem somewhere in the system. Slowly executing tasks can degrade a site's performance, degrade application performance, and consequently, cause failure of the site or application.

Accordingly, developers seek to debug software when an application or transaction is performing poorly to determine what part of the code is causing the performance problem. While it may be relatively easy to detect when an application is performing slowly because of slow response times or longer transaction times, it is often difficult to diagnose which portion of the software is responsible for the degraded performance. Typically, developers must manually diagnose portions of the code based on manual observations. Even if a developer successfully determines which method, function, routine, process, etc. is executing when an issue occurs, it is often difficult to determine whether the problem lies with the identified method, etc., or whether the problem lies with another method, function, routine, process, etc. that is called by the identified method. Furthermore, it is often not apparent what is a typical or appropriate execution time for a portion of an application or transaction. Thus, even with information regarding the time associated with a piece of code, the developer may not be able to determine whether the execution time is indicative of a performance problem or not.

SUMMARY OF THE INVENTION

Programmatic root cause analysis of application performance problems is provided in accordance with various embodiments. Transactions having multiple components can be monitored to determine if they are exceeding a threshold for their execution time. Monitoring the transactions can include instrumenting one or more applications to gather component level information. For transactions exceeding a threshold, the data collected for the individual components can be analyzed to automatically diagnose the potential cause of the performance problem. Time-series analytical techniques are employed to determine normal values for transaction and component execution times. The values can be dynamic or static. Deviations from these normal values can be detected and reported as a possible cause. Other filters in addition to or in place of execution times for transactions and components can also be used.

In one embodiment, a method of processing data is provided that includes collecting data about a set of transactions that each include a plurality of components associated with a plurality of tasks. The data includes time series data for each task based on execution times of components associated with the task during the set of transactions. The method further includes determining whether the transactions have execution times exceeding a threshold and for each transaction having an execution time exceeding the threshold, identifying one or more components based on a deviation in time series data for a task that is associated with the one or more components of each transaction, and reporting said one or more components for said each transaction.

One embodiment includes an apparatus for monitoring software that includes one or more agents and a manager in communication with the agents. The agents collect data about a set of transactions that each include a plurality of components associated with a plurality of systems. The manager performs a method including receiving the data about the set of transactions from the one or more agents and developing time series data for each of the systems based on execution times of components associated with each system during the set of transactions. For each transaction having an execution time beyond a threshold, the manager identifies one or more components based on a deviation in time series data for a system that is associated with the one or more components of each transaction, and reports the one or more components for each transaction.

Embodiments in accordance with the present disclosure can be accomplished using hardware, software or a combination of both hardware and software. The software can be stored on one or more processor readable storage devices such as hard disk drives, CD-ROMs, DVDs, optical disks, floppy disks, tape drives, RAM, ROM, flash memory or other suitable storage device(s). In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more storage devices, peripherals and/or communication interfaces.

BRIEF DESCRIPTION OF THE DRAWINGS

FIG. 4 is a flowchart of a process for starting the tracing of transactions in accordance with one embodiment.

FIG. 5 is a flowchart of a process for concluding the tracing of transactions in accordance with one embodiment.

FIG. 8 is a table depicting exemplary component data for a plurality of transactions collected by an enterprise manager in accordance with one embodiment.

FIG. 9 is a table depicting exemplary component data for a plurality of transactions collected by an enterprise manager in accordance with one embodiment.

FIG. 10 is a table depicting exemplary component data for a plurality of transactions collected by an enterprise manager in accordance with one embodiment.

FIG. 14 is a flowchart of a process in accordance with one embodiment for reporting data in the transaction trace table of the graphical user interface depicted in FIG. 6.

FIG. 15 is a flowchart of a process for displaying a transaction snap shot in accordance with one embodiment.

FIG. 16 is a flowchart of a process for drawing a view for a component in accordance with one embodiment.

FIG. 17 is a flowchart of a process for reporting detailed information about a component of a transaction in accordance with one embodiment.

DETAILED DESCRIPTION

Figure 1:
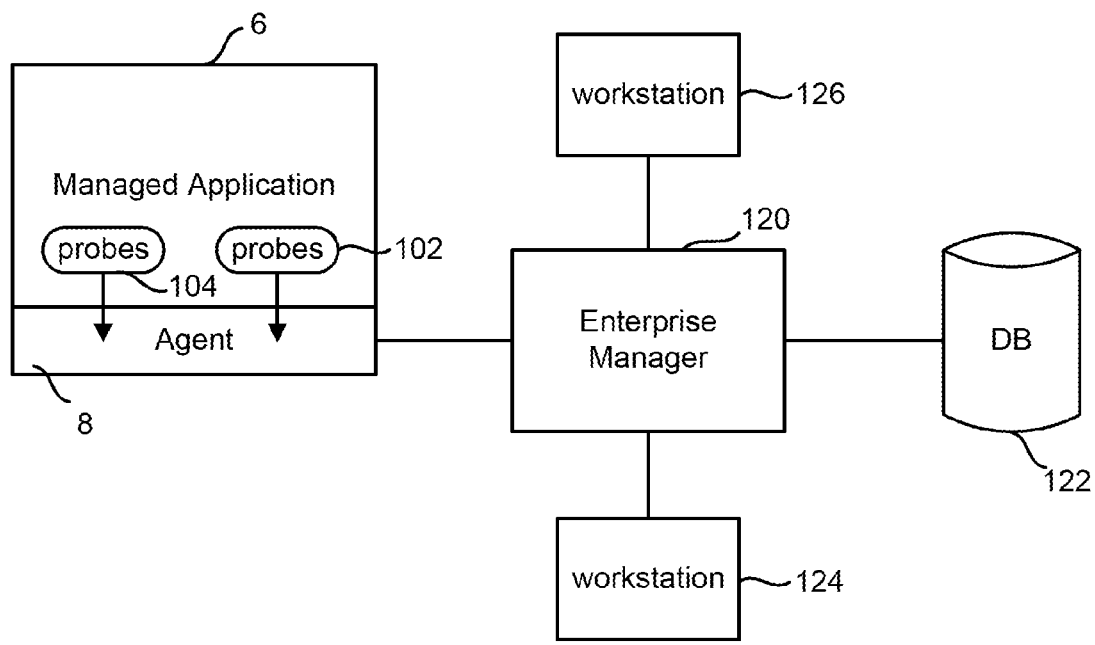
FIG. 1 is a block diagram of a system including a tool for monitoring an application in accordance with one embodiment.

Programmatic root cause analysis of performance problems for application performance management is provided in accordance with embodiments of the present disclosure. Transactions are traced and one or more components of a transaction that are executing too slowly or otherwise causing a performance problem are reported. A transaction is traced to determine whether its execution time is beyond a threshold. If a transaction has a root level execution time outside a threshold, it can be reported. Tracing the transaction includes collecting information regarding the execution times of individual components of the transaction. For reported transactions, one or more components of the transaction can be identified and reported as a potential cause of the slow execution time for the transaction. If a particular component has an execution time beyond a threshold for a task or system associated with the component, the component can be identified and reported.

Component data is collected when tracing a set of transactions of a particular type. This component data can be organized into time series data for a particular type of component. For example, time series data can be formulated using the execution time of related components of multiple transactions. Related components can include a component from each transaction that is responsible for executing a particular task. The execution time of these components can be organized into time series data for the particular task. The data can also be organized by the system associated with or on which each of the components execute. If a particular transaction is performing abnormally, each of its components can be examined. Each component's execution time can be compared to a threshold based on a normal execution time for the task or system associated with that component. If a component's execution time is outside a normal time for the task it performs or the system with which it is associated, the component can be reported as a potential cause of the transaction's performance problem.

In one embodiment, a graphical user interface is used to report transactions and components that exceed a threshold. For each reported transaction, a visualization can be provided that enables a user to immediately understand where time was spent in a traced transaction. The visualization can identify select components of the reported transaction as a potential cause of a transaction's performance problem, by virtue of having an execution time beyond a threshold. The component thresholds may take the form of threshold deviations from a normal value or threshold execution times.

In one embodiment of the present disclosure, methods, etc. in a JAVA environment are monitored. In such an embodiment, a transaction may be a method invocation in a running software system that enters the JAVA virtual machine (JVM) and exits the JVM (and all that it calls). A system in accordance with embodiments as hereinafter described can initiate transaction tracing on one, some or all transactions managed by the system. Although embodiments are principally disclosed using JAVA implementation examples, the disclosed technology is not so limited and may be used in and with other programming languages, paradigms, systems and/or environments.

In one embodiment, an application performance management tool is provided that implements the performance analysis described herein. FIG. 1 provides a conceptual view of one such implementation. The tool includes an enterprise manager 120, database 122, workstation 124, and workstation 126. FIG. 1 also depicts a managed application 6 containing probe 102, probe 104, and agent 8. As the managed application runs, the probes relay data to agent 8. Agent 8 collects, summarizes, and sends the data to enterprise manager 120.

Enterprise manager 120 receives performance data from managed applications via agent 8, runs requested calculations, makes performance data available to workstations 124, 126 and optionally sends performance data to database 122 for later analysis. The workstations include the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections.

In one embodiment of FIG. 1, each component runs on a different machine. For example, workstation 126 is on a first computing device, workstation 124 is on a second computing device, enterprise manager 120 is on a third computing device, and managed application 6 is on a fourth computing device. In another embodiment, two or more (or all) of the components are operating on the same computing device. For example, managed application 6 and agent 8 may be on a first computing device, enterprise manager 120 on a second computing device and a workstation on a third computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the disclosed technology is implemented in software that is stored on one or more processor readable storage devices and is used to program one or more processors.

In one embodiment, an application performance management tool monitors performance of an application by accessing the application's source code and modifying that source code. In some instances, however, the source code may not be available to the application performance management tool. Accordingly, another embodiment monitors performance of an application without requiring access to or modification of the application's source code. Rather, the tool can instrument the application's object code (also called bytecode).

Figure 2:
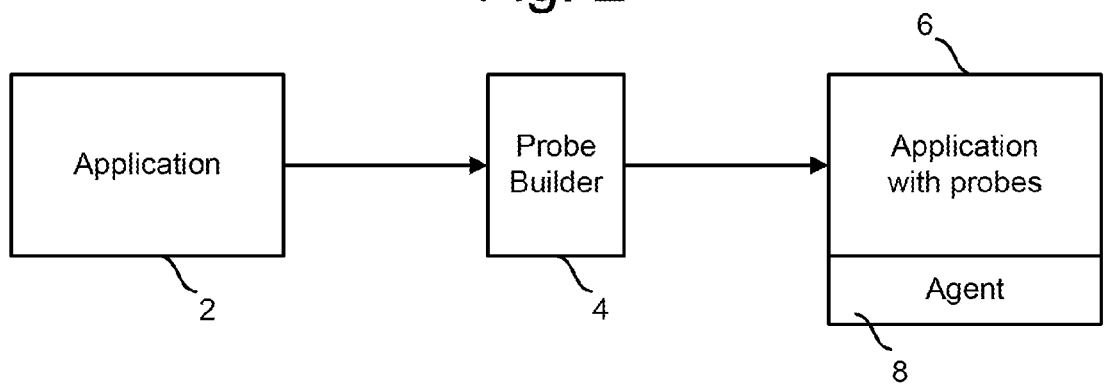
FIG. 2 is a block diagram depicting the instrumentation of byte code by a probe builder in accordance with one embodiment.

FIG. 2 depicts an exemplary process for modifying an application's bytecode to create managed application 6. FIG. 1 includes application 2, probe builder 4, application 6 and agent 8. Application 6 includes probes, which will be discussed in more detail below. Application 2 is the Java application before the probes are added. In embodiments that use a programming language other than Java, application 2 can be a different type of application.

Probe Builder 4 instruments (e.g. modifies) the bytecode for application 2 to add probes and additional code to application 2 in order to create application 6. The probes measure specific pieces of information about the application without changing the application's business logic. Probe builder 4 also installs agent 8 on the same machine as application 6. Once the probes have been installed in the bytecode, the Java application is referred to as a managed application. More information about instrumenting byte code can be found in the following: U.S. Pat. No. 6,260,187, entitled "System For Modifying Object Oriented Code;" U.S. patent application Ser. No. 09/795,901, entitled "Adding Functionality to Existing Code at Exits;" U.S. patent Ser. No. 10/692,250, entitled "Assessing Information at Object Creation;" and U.S. patent application Ser. No. 10/622,022, entitled "Assessing Return Values and Exceptions, all of which are incorporated by reference herein in their entirety.

In accordance with one embodiment, bytecode is instrumented by adding new code that activates a tracing mechanism when a method starts and terminates the tracing mechanism when the method completes. To better explain this concept consider the following exemplary pseudo code for a method called "exampleMethod." This method receives an integer parameter, adds 1 to the integer parameter, and returns the sum:

```
public int
    exampleMethod(int x)
        {
        return x + 1;
        }
```

One embodiment will instrument this code, conceptually, by including a call to a tracer method, grouping the original instructions from the method in a "try" block, and adding a "finally" block with a code that stops the tracer:

```
public int
    exampleMethod(int x)
        {
        IMethodTracer tracer = AMethodTracer.loadTracer(
                "com.introscope.agenttrace.MethodTimer",
                this,
                "com.wily.example.ExampleApp",
                "exampleMethod",
                "name=Example Stat");
        try     {
                return x + 1;
                } finally   {
                        tracer.finishTrace( );
                        }
        }
```

IMethodTracer is an interface that defines a tracer for profiling. AMethodTracer is an abstract class that implements IMethodTracer. IMethodTracer includes the methods startTrace and finishTrace. AMethodTracer includes the methods startTrace, finishTrace, dostartTrace and dofinishTrace. The method startTrace is called to start a tracer, perform error handling and perform setup for starting the tracer. The actual tracer is started by the method doStartTrace, which is called by startTrace. The method finishTrace is called to stop the tracer and perform error handling. The method finishTrace calls doFinishTrace to actually stop the tracer. Within AMethodTracer, startTrace and finishTracer are final and void methods; and doStartTrace and doFinishTrace are protected, abstract and void methods. Thus, the methods doStartTrace and doFinishTrace must be implemented in subclasses of AMethodTracer. Each of the subclasses of AMethodTracer implement the actual tracers. The method loadTracer is a static method that calls startTrace and includes five parameters. The first parameter, "com.introscope . . . ." is the name of the class that is intended to be instantiated that implements the tracer. The second parameter, "this" is the object being traced. The third parameter, "com.wily.example . . . ," is the name of the class of which the current instruction is inside. The fourth parameter, "exampleMethod," is the name of the method of which the current instruction is inside. The fifth parameter, "name= . . . " is the name under which the statistics are recorded. The original instruction (return x+1) is placed inside a "try" block. The code for stopping the tracer (a call to the static method tracer.finishTrace) is put within the finally block.

The above example shows source code being instrumented. In one embodiment, source code is not actually modified. Rather, an application management tool modifies object code. The source code examples above are used for illustration to explain the concept of instrumentation in accordance with embodiments. The object code is modified conceptually in the same manner that source code modifications are explained above. That is, the object code is modified to add the functionality of the "try" block and "finally" block. In another embodiment, the source code can be modified as explained above.

In a typical implementation including an application performance management tool as provided herein, more than one application will be monitored. The various applications can reside on a single computing device or on different computing devices. An agent may be installed for each managed application or on only a subset of the applications. Each agent will report back to enterprise manager 120 with data collected for the application it manages. Agents can also report data for applications that they do not directly manage, such as an application on a different computing device. The agent may collect data by monitoring response times or installing scripts to collect data from a remote application. For example, Javascript inserted into a returned web page can execute to determine the execution time of a remote application such as a browser.

Figure 3:
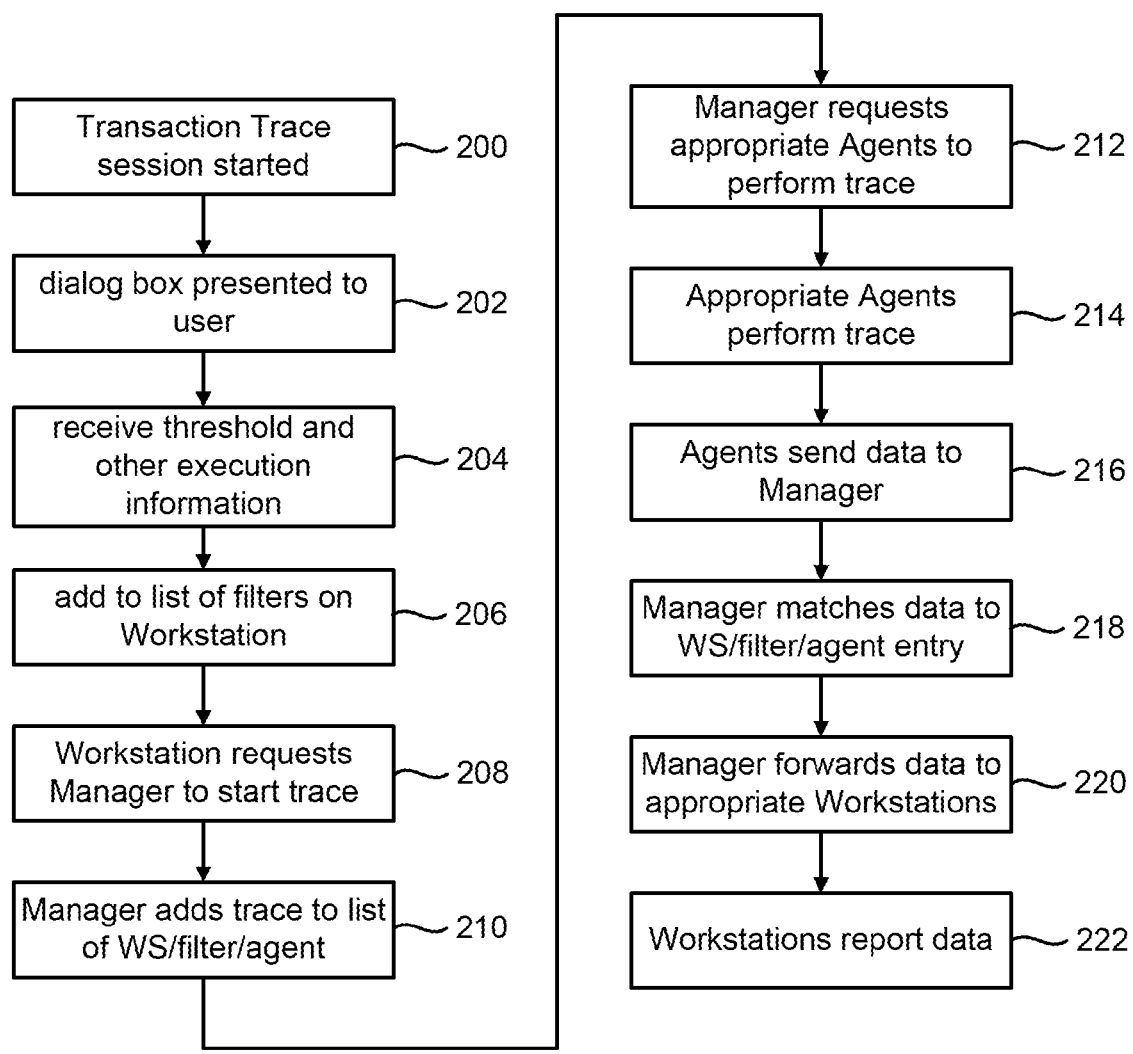
FIG. 3 is a flowchart of a process for tracing transactions in accordance with one embodiment using the system of FIG. 1.

FIG. 3 is a flowchart describing one embodiment of a process for tracing transactions using the system of FIG. 1. In step 200, a transaction trace session is started. In one embodiment of step 200, a window is opened and a user selects a dropdown menu to start a transaction trace session. In other embodiments, other methods can be used to start the session. In step 202, a dialog box is presented to the user. This dialog box will ask the user for various configuration information. In step 204, the various configuration information is provided by the user typing information into the dialogue box. Other means for entering the information can also be used within the spirit of the present disclosure.

One variable entered by the user in step 204 is the threshold trace period. That is, the user enters a time, which could be in seconds, milliseconds, microseconds, etc. The system will only report those transactions that have an execution time longer than the threshold period provided. For example, if the threshold is one second, the system will only report transactions that are executing for longer than one second. In some embodiments, step 204 only includes providing a threshold time period. In other embodiments, other configuration data can also be provided. For example, the user can identify an agent, a set of agents, or all agents. In such an embodiment, only identified agents will perform the transaction tracing described herein. In another embodiment, enterprise manager 120 will determine which agents to use.

Another configuration variable that can be provided is the session length. The session length indicates how long the system will perform the tracing. For example, if the session length is ten minutes, the system will only trace transactions for ten minutes. At the end of the ten minute period, new transactions that are started will not be traced. However, transactions that have already started during the ten minute period will continue to be traced. In other embodiments, at the end of the session length, all tracing will cease regardless of when the transaction started. Other configuration data can also include specifying one or more userIDs, a flag set by an external process or other data of interest to the user. For example, the userID is used to specify that only transactions initiated by processes associated with a particular one or more userIDs will be traced. The flag is used so that an external process can set a flag for certain transactions, and only those transactions that have the flag set will be traced. Other parameters can also be used to identify which transactions to trace. The information provided in step 204 can be used to create a filter.

In other embodiments as will be more fully described hereinafter, variations to the trace period are utilized. A user may specify a threshold execution time for a type of transaction. A user may specify a threshold deviation from a normal execution time and capture faster or more slowly executing transactions. Transactions exceeding the corresponding threshold will be reported. In one embodiment, a user does not provide a threshold execution time, deviation, or trace period for transactions being traced. Rather, the application performance management tool intelligently determines the threshold(s). For example, the tool can average execution times of transactions of a particular type to determine a corresponding threshold execution time. The threshold time can be a static value or a dynamic value that is updated as more transaction data is collected. The threshold may be a running average based on a number of previous transactions. Other more sophisticated time series techniques may also be used as will be described hereinafter.

In step 206 of FIG. 3, the workstation adds the new filter to a list of filters on the workstation. In step 208, the workstation requests enterprise manager 120 to start the trace using the new filter. In step 210, enterprise manager 120 adds the filter received from the workstation to a list of filters. For each filter in its list, enterprise manager 120 stores an identification of the workstation that requested the filter, the details of the filter (described above), and the agents to which the filter applies. In one embodiment, if the workstation does not specify the agents to which the filter applies, then the filter will apply to all agents. In step 212, enterprise manager 120 requests the appropriate agents to perform the trace. In step 214, the appropriate agents perform the trace. In step 216, the agents performing the trace send data to enterprise manager 120. More information about steps 214 and 216 will be provided below. In step 218, enterprise manager 120 matches the received data to the appropriate workstation/filter/agent entry. In step 220, enterprise manager 120 forwards the data to the appropriate workstation(s) based on the matching in step 218. In step 222, the appropriate workstations report the data. In one embodiment, the workstation can report the data by writing information to a text file, to a relational database, or other data container. In another embodiment, a workstation can report the data by displaying the data in a GUI. More information about how data is reported is provided below.

As noted above, agents perform tracing for transactions. To perform such tracing, the agents can leverage what is called Blame Technology in one embodiment. Blame Technology works in a managed Java application to enable the identification of component interactions and component resource usage. Blame Technology tracks components that are specified to it. Blame Technology uses the concepts of consumers and resources. Consumers request some activity while resources perform the activity. A component can be both a consumer and a resource, depending on the context.

When reporting about transactions, the word Called designates a resource. This resource is a resource (or a sub-resource) of the parent component, which is the consumer. For example, under the consumer Servlet A (see below), there may be a sub-resource Called EJB. Consumers and resources can be reported in a tree-like manner. Data for a transaction can also be stored according to the tree. For example, if a Servlet (e.g. Servlet A) is a consumer of a network socket (e.g. Socket C) and is also a consumer of an EJB (e.g. EJB B), which is a consumer of a JDBC (e.g. JDBC D), the tree might look something like the following:

Servlet A
    Data for Servlet A

```
        Called EJB B
            Data for EJB B
                Called JDBC D
                    Data for JDBC D
            Called Socket C
                Data for Socket C
```

In one embodiment, the above tree is stored by the agent in a stack. This stack is called the Blame Stack. When transactions are started, they are pushed onto the stack. When transactions are completed, they are popped off the stack. In one embodiment, each transaction on the stack has the following information stored: type of transaction, a name used by the system for that transaction, a hash map of parameters, a timestamp for when the transaction was pushed onto the stack, and sub-elements. Sub-elements are Blame Stack entries for other components (e.g. methods, process, procedure, function, thread, set of instructions, etc.) that are started from within the transaction of interest. Using the tree as an example above, the Blame Stack entry for Servlet A would have two sub-elements. The first sub-element would be an entry for EJB B and the second sub-element would be an entry for Socket Space C. Even though a sub-element is part of an entry for a particular transaction, the sub-element will also have its own Blame Stack entry. As the tree above notes, EJB B is a sub-element of Servlet A and also has its own entry. The top (or initial) entry (e.g., Servlet A) for a transaction, is called the root component. Each of the entries on the stack is an object. While the embodiment described herein includes the use of Blame Technology and a stack, other embodiments can use different types of stacks, different types of data structures, or other means for storing information about transactions.

FIG. 4 is a flowchart describing one embodiment of a process for starting the tracing of a transaction. The steps of FIG. 4 are performed by the appropriate agent(s). In step 302, a transaction starts. In one embodiment, the process is triggered by the start of a method as described above (e.g. the calling of the "loadTracer" method). In step 304, the agent acquires the desired parameter information. In one embodiment, a user can configure which parameter information is to be acquired via a configuration file or the GUI. The acquired parameters are stored in a hash map, which is part of the object pushed onto the Blame Stack. In other embodiments, the identification of parameters are pre-configured. There are many different parameters that can be stored. In one embodiment, the actual list of parameters used is dependent on the application being monitored. The present disclosure is not limited to any particular set of parameters. Table 1 provides examples of some parameters that can be used.

TABLE 1

| Parameters | Appears in | Value |
| --- | --- | --- |
| UserID | Servlet, JSP | The UserID of the end-user invoking the http servlet request. |
| URL | Servlet, JSP | The URL passed through to the servlet or JSP, not including the Query String. |
| URL Query | Servlet, JSP | The portion of the URL that specifies query parameters in the http request (text that follows the '?' delimiter). |
| Dynamic SQL | Dynamic JDBC Statements | The dynamic SQL statement, either in a generalized form or with all the specific parameters from the current invocation. |
| Method | Blamed Method timers (everything but Servlets, JSP's and JDBC Statements) | The name of the traced method. If the traced method directly calls another method within the same component, only the "outermost" first encountered method is captured. |
| Callable SQL | Callable JDBC statements | The callable SQL statement, either in a generalized form or with all the specific parameters from the current invocation. |
| Prepared SQL | Prepared JDBC statements | The prepared SQL statement, either in a generalized form or with all the specific parameters from the current invocation. |
| Object | All non-static methods | toString( ) of the this object of the traced component, truncated to some upper limit of characters. |
| Class Name | All | Fully qualified name of the class of the traced component. |
| Param_n | All objects with WithParams custom tracers | toString( ) of the nth parameter passed to the traced method of the component. |
| Primary Key | Entity Beans | toString( ) of the entity bean's property key, truncated to some upper limit of characters. |

In step 306, the system acquires a timestamp indicating the current time. In step 308, a stack entry is created. In step 310, the stack entry is pushed onto the Blame Stack. In one embodiment, the timestamp is added as part of step 310. The process of FIG. 4 is performed when a transaction is started. A process similar to that of FIG. 4 is performed when a component of the transaction starts (e.g. EJB B is a component of Servlet A—see tree described above).

FIG. 5 is a flowchart describing one embodiment of a process for concluding the tracing of a transaction. The process of FIG. 5 can be performed by an agent when a transaction ends. In step 340, the process is triggered by a transaction (e.g. method) ending as described above (e.g. calling of the method "finishTrace"). In step 342, the system acquires the current time. In step 344, the stack entry is removed. In step 346, the execution time of the transaction is calculated by comparing the timestamp from step 342 to the timestamp stored in the stack entry. In step 348, the filter for the trace is applied. For example, the filter may include a threshold execution time of one second. Thus, step 348, would include determining whether the calculated duration from step 346 is greater than one second. In another embodiment, a normal value for the type of transaction is used with a threshold deviation. If the transaction's execution time deviates from the normal value by more than threshold amount, the threshold is determined to be exceeded. If the threshold is not exceeded (step 350), then the data for the transaction is discarded. In one embodiment, the entire stack entry is discarded. In another embodiment, only the parameters and timestamps are discarded. In other embodiments, various subsets of data can be discarded. In some embodiments, if the threshold period is not exceeded then the data is not transmitted by the agent to other components in the system of FIG. 2. If the duration exceeds the threshold (step 350), then the agent builds component data in step 360. Component data is the data about the transaction that will be reported. In one embodiment, the component data includes the name of the transaction, the type of the transaction, the start time of the transaction, the duration of the transaction, a hash map of the parameters, and all of the sub-elements or components of the transaction (which can be a recursive list of elements). Other information can also be part of the component data. In step 362, the agent reports the component data by sending the component data via the TCP/IP protocol to enterprise manager 120.

FIG. 5 represents what happens when a transaction finishes. When a component finishes, the steps can include getting a time stamp, removing the stack entry for the component, and adding the completed sub-element to previous stack entry. In one embodiment, the filters and decision logic are applied to the start and end of the transaction, rather than to a specific component.

Note that in one embodiment, if the transaction tracer is off, the system will still use the Blame Stack; however, parameters will not be stored and no component data will be created. In some embodiments, the system defaults to starting with the tracing technology off. The tracing only starts after a user requests it, as described above.

Figure 6:
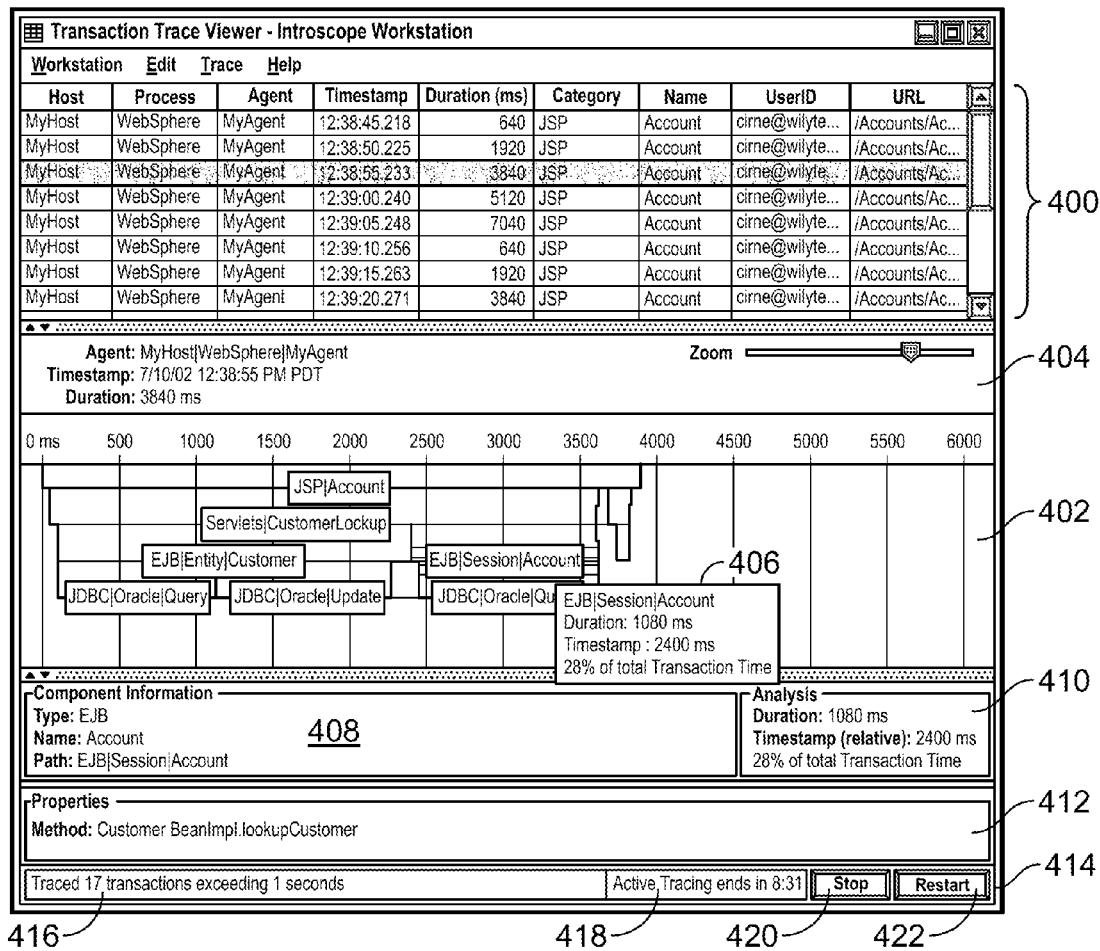
FIG. 6 depicts a graphical user interface in accordance with one embodiment.

FIG. 6 provides one example of a graphical user interface that can be used for reporting transactions and components thereof, in accordance with embodiments of the present disclosure. The GUI includes a transaction trace table 400 which lists all of the transactions that have satisfied the filter (e.g. execution time beyond the threshold). Because the number of rows on the table may be bigger than the allotted space, the transaction trace table 400 can scroll. Table 2, below, provides a description of each of the columns of transaction trace table 400.

TABLE 2

| Column Header | Value |
| --- | --- |
| Host | Host that the traced Agent is running on |
| Process | Agent Process name |
| Agent | Agent ID |
| TimeStamp (HH:MM:SS.DDD) | TimeStamp (in Agent's JVM's clock) of the initiation of the Trace Instance's root entry point |
| Category | Type of component being invoked at the root level of the Trace Instance. This maps to the first segment of the component's relative blame stack: Examples include Servlets, JSP, EJB, JNDI, JDBC, etc. |
| Name | Name of the component being invoked. This maps to the last segment of the blamed component's metric path. (e.g. for "Servlets|MyServlet", Category would be Servlets, and Name would be MyServlet). |
| URL | If the root level component is a Servlet or JSP, the URL passed to the Servlet/JSP to invoke this Trace Instance. If the application server provides services to see the externally visible URL (which may differ from the converted URL passed to the Servlet/JSP) then the externally visible URL will be used in preference to the "standard" URL that would be seen in any J2EE Servlet or JSP. If the root level component is not a Servlet or JSP, no value is provided. |
| Duration (ms) | Execution time of the root level component in the Transaction Trace data |
| UserID | If the root level component is a Servlet or JSP, and the Agent can successfully detect UserID's in the managed application, the UserID associated with the JSP or Servlet's invocation. If there is no UserID, or the UserID cannot be detected, or the root level component is not a Servlet or JSP, then there will be no value placed in this column. |

Each transaction that has an execution time beyond a threshold will appear in the transaction trace table 400. The user can select any of the transactions in the transaction trace table by clicking with the mouse or using a different means for selecting a row. When a transaction is selected, detailed information about that transaction will be displayed in transaction snapshot 402 and snapshot header 404.

Transaction snapshot 402 provides information about which transactional components are called and for how long. Transaction snapshot 402 includes views (see the rectangles) for various components, which will be discussed below. If the user positions a mouse (or other pointer) over any of the views, mouse-over info box 406 is provided. Mouse-over info box 406 indicates the following information for a component: name/type, duration, timestamp and percentage of the transaction time that the component was executing. More information about transaction snapshot 402 will be explained below. Transaction snapshot header 404 includes identification of the agent providing the selected transaction, the timestamp of when that transaction was initiated, and the duration. Transaction snapshot header 404 also includes a slider to zoom in or zoom out the level of detail of the timing information in transaction snapshot 402. The zooming can be done in real time.

In addition to the transaction snapshot, the GUI will also provide additional information about any of the transactions within the transaction snapshot 402. If the user selects any of the transactions (e.g., by clicking on a view), detailed information about that transaction is provided in regions 408, 410, and 412 of the GUI. Region 408 provides component information, including the type of component, the name the system has given to that component and a path to that component. Region 410 provides analysis of that component, including the duration the component was executing, a timestamp for when that component started relative to the start of the entire transaction, and an indication of the percentage of the transaction time that the component was executing. Region 412 includes indication of any properties. These properties are one or more of the parameters that are stored in the Blame Stack, as discussed above.

The GUI also includes a status bar 414. The status bar includes an indication 416 of how many transactions are in the transaction trace table, an indication 418 of how much time is left for tracing based on the session length, stop button 420, and restart button 422.

Figure 7:
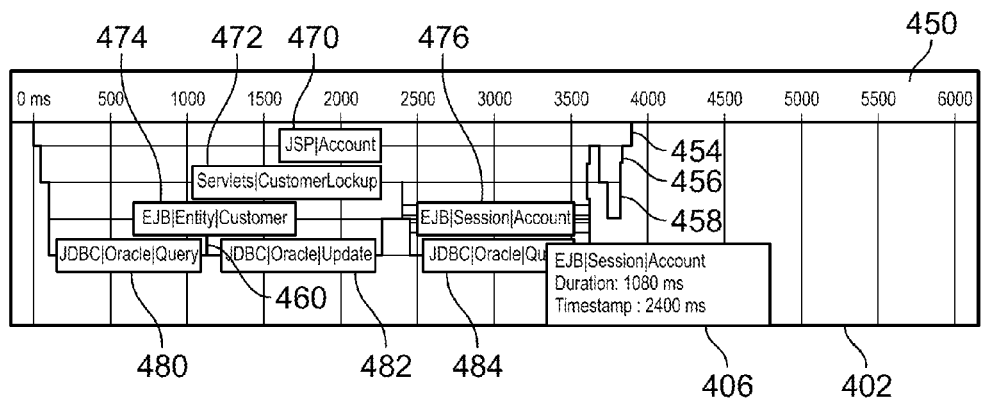
FIG. 7 depicts a portion of the graphical user interface of FIG. 6.

FIG. 7 depicts transaction snapshot 402. Along the top of snapshot 402 is time axis 450. In one embodiment, the time axis is in milliseconds. The granularity of the time access is determined by the zoom slider in snapshot header 404. Below the time axis is a graphical display of the various components of a transaction. The visualization includes a set of rows 454, 456, 458, and 460 along an axis indicating the call stack position. Each row corresponds to a level of components. The top row pertains to the root component 470. Within each row is one or more boxes which identify the components. In one embodiment, the identification includes indication of the category (which is the type of component—JSP, EJB, servlets, JDBC, etc.) and a name given to the component by the system. The root level component is identified by box 470 as JSP|Account. In the transaction snapshot, this root level component starts at time zero. The start time for the root level component is the start time for the transaction and the transaction ends when the root level component JSP|Account 470 completes. In the present case, the root level component completes in approximately 3800 milliseconds. Each of the levels below the root level 470 includes components called by the previous level. For example, the method identified by JSP/Account may call a servlet called CustomerLookup. Servlet|CustomerLookup is called just after the start of JSP|Account 470 and Servlet|CustomerLookup 472 terminates approximately just less than 3500 milliseconds. Servlets|CustomerLookup 472 calls EJB|Entity|Customer 474 at approximately 200 milliseconds. EJB|entity customer 474 terminates at approximately 2400 milliseconds, at which time Servlet|CustomerLookup 472 calls EJB|Session|Account 476. EJB|session account 647626 is started at approximately 2400 milliseconds and terminates at approximately 3400 milliseconds. EJB|EntityCustomer 474 calls JDBC|Oracle|Query 480 at approximately 250 milliseconds. JDBC|Oracle|Query 480 concludes at approximately 1000 milliseconds, at which time EJB|Entity|Customer 474 calls JDBC|Oracle|Update 482 (which itself ends at approximately 2300 milliseconds). EJB/Session/Account 476 calls JDBC|Oracle/Query 484, which terminates at approximately 3400 milliseconds. Thus, snapshot 402 provides a graphical way of displaying which components call which components. Snapshot 402 also shows for how long each component was executing. Thus, if the execution of JSP|Account 470 took too long, the graphical view of snapshot 402 will allow user to see which of the subcomponents is to blame for the long execution of JSP account 470.

The transaction snapshot provides for the visualization of time from left to right and the visualization of the call stack top to bottom. Clicking on any view allows the user to see more details about the selected component. A user can easily see the run or execution time of a particular component that may be causing a transaction to run too slowly. If a transaction is too slow, it is likely that one of the components is running significantly longer than it should be. The user can see the execution times of each component and attempt to debug that particular component.

In one embodiment, the application performance management tool automatically identifies and reports one or more components that may be executing too slowly. The identification and reporting is performed without user intervention in one embodiment. Moreover, normal execution times for transactions and components can be dynamically and automatically generated.

Transactions are identified and component data reported, such as through the GUI depicted in FIGS. 6 and 7, to enable end-users to diagnose the root cause of a performance problem associated with a particular transaction. To further facilitate the management of application performance, the root cause of a performance problem is programmatically diagnosed in accordance with one embodiment. The diagnosis is implemented in one embodiment by analyzing the component data for a selected transaction. After analysis, one or more components are identified as a potential cause of the application's performance problem. These components can be reported to the end-user as an automatic diagnosis of the cause of an identified performance problem. Such implementations enable abnormally performing components of transactions to be programmatically identified and reported without user intervention. By eliminating required human analysis of raw component data, designers, managers, and administrators can more quickly, efficiently, and reliably identify poorly performing components.

FIG. 8 is a table depicting exemplary component data for four transactions of the same transaction type. The individual tasks performed for the illustrated transaction type are set forth in column 502. In a Java environment for example, each task may be a set(s) of code that is instantiated and executed for the associated component of each transaction. The transaction component refers to an instance of the code for the task that is executed during a particular transaction in such an implementation. In some embodiments, however, different sets of code can be used or instantiated to perform the same task for different transactions of the same type.

Data for each component of individual transactions that perform each task is set forth in each corresponding row. Transactions 1, 2, 3, and 4 each include a component for performing each of the identified tasks. Typically, each component of the transactions that perform the same task are of the same component type. Column 504 sets forth the data for transaction 1, column 506 sets forth the data for transaction 2, column 508 sets forth the data for transaction 3, and column 510 sets forth the data for transaction 4. By way of example, transaction 1 includes a first component that performs the task JSP|Account and has an execution time of 3825 ms. Transaction 1 further includes a second component having an execution time of 3450 ms for performing the task Servlet|CustomerLookup, a third component having an execution time of 2225 ms for performing the task EJB|Entity|Cusomter, a fourth component having an execution time of 990 ms for performing the task EJB|Session|Account, a fifth component having an execution time of 755 ms for performing the task JDBC|Oracle|Query, a sixth component having an execution time of 1310 ms for performing the task JDBC|Oracle|Update, and a seventh component having an execution time of 700 ms for performing the task JDBC|Oracle|Query a second time. Transactions 2, 3, and 4 also have components for performing each transaction.

Together, the execution times of each transactional component associated with a particular task forms time series data for that task. Time series analytical techniques can be used on this data to determine if a component of a transaction performs abnormally. For example, after determining that a particular transaction has an execution time outside a threshold, the time series data can be used to identify one or more components of the transaction that may be causing the performance problem.

Column 512 sets forth a normal execution time associated with each task. In one embodiment, the normal execution time for each task is determined by averaging the execution times of each transaction component when performing that task. The normal execution time is a static value in one embodiment that is determined from past component executions prior to beginning transaction tracing. In another embodiment, the normal execution time is a dynamic value. For example, the normal execution time can be recalculated after every N transactions using the component execution times for the last N transactions. More sophisticated time series analytical techniques are used in other embodiments. For example, determining a normal execution time for a task can include identifying trends and seasonal variations in the time series data to predict a normal value for the task's execution time. Holt's Linear Exponential Smoothing is employed in one embodiment to determine a normal execution time for a transaction. Holt's Linear Exponential Smoothing is a known technique that combines weighted averaging and trend identification in a computationally low-cost manner. This technique is very suitable for real-time updates to determine a normal value for task execution time.

Column 514 sets forth a threshold for each task. If the times series data for a component deviates from the normal execution time for the associated task by more than the threshold, the component is identified as a potential cause of a performance problem. These components can be reported when diagnosing the root cause of an identified transactional performance problem. In one embodiment, threshold deviations are applied so as to only identify components having an execution time that exceeds the normal value by more than the threshold. In other embodiments, if the execution time is below the normal value by more than the threshold, the component can be identified. In yet another embodiment, a threshold execution time is applied directly to the component rather than a threshold deviation.

Row 516 sets forth the total execution time of each transaction as well as a normal execution time and threshold. The total transaction time is equal to the execution time of each component of the transaction. The normal value can be calculated as previously described. Simple averaging of a number of transaction execution times or more sophisticated time-series techniques applied. The threshold can also be calculated as previously described. Static or dynamic threshold values can be used. The threshold can be expressed as a threshold execution time for the transaction or a threshold deviation from a normal value for the type of transaction.

The total transaction time can be compared to the normal value using the threshold deviation (or compared directly to a threshold transaction time). Those transactions having a total execution time beyond the threshold can be identified and reported, for example, as shown in FIGS. 6 and 7. For the reported transactions, the component data can be examined to determine if there were any abnormalities. For example, transaction 3 has a total execution time of 13,275 ms. This transaction time is beyond the threshold execution time so the transaction is reported. The JSP|Account component had an execution time of 3900 ms, which deviated from the normal value by more than the threshold. This component can be reported for transaction 3. In some embodiments, only transactions having an execution time over the normal value by the threshold are reported. In one embodiment, if a transaction has an execution time above the normal value by more than the threshold, only components having execution times that are above their corresponding normal value are reported. That is, components that have an execution time below the normal by more than their threshold will not be reported. In other embodiments, components with execution times below their normal by more than the threshold amount can be reported as well. For transactions having execution times below the normal by more than the threshold, components above and/or below their normal values by more than the threshold can be reported as well.

In FIG. 9, an embodiment is depicted whereby component data is used to formulate time series data according to the systems involved in the type of transaction. In implementations where each component is directly associated with a particular system, system-level time series data may correspond directly to task-level time series data. In other implementations, such as where transactional components for the same task may execute on different systems in different transactions, such correspondence may not exist and the time series data will be different. Data for multiple tasks may also be grouped by system to consolidate data.

FIG. 9 depicts time series data for a set of web-based transactions involving a browser, network, web server, identity server, application server, database server, messaging server, and CICS server. The individual systems are listed in column 520. Common web-based transactions represented by the example in FIG. 9 could include an initial browser request issued over the network to the web server to complete a purchase, request information, etc. The web server calls the identity server to authenticate the user and then calls the application server to complete the transaction. The application server issues a call to the database server, messaging server, and CICS server to perform the transaction. The application server then returns a result to the web server, which in turn responds to the browser over the network.

Columns 522, 524, 526, and 528 list the execution times at each system by individual components of transactions 1, 2, 3, and 4, respectively. Each entry for a transaction may correspond to the execution time of one or more components of the transactions that are associated with the identified system. By way of example, transaction 1 includes execution times of 9.8 ms for the browser component(s), 99.8 ms for the network component(s), 9.9 ms for the web server component(s), 198 ms for the identity server component(s), another 10.1 ms for the web server component(s), 51 ms for the application server component(s), 98 ms for the database server component(s), 49.5 for the application server component(s), 101 ms for the messaging server component(s), 21 ms for the application server component(s), 200 for the CICS server component(s), 29.5 ms for the application server component(s), 10.1 ms for the web server component(s), 10.1 ms for the web server component(s), 99.8 ms for the network server component(s), and 10.3 ms for the browser component(s). Particular systems are listed more than once for the transactions to represent that these systems are involved in the transaction at multiple points. Different components of the transactions may be invoked to perform different tasks at the systems during these different points of the transactions.

Normal execution times are depicted in column 530 for each system during each individual part of the transaction. Like the values depicted in FIG. 8, the normal execution times can be static or dynamic values. Different analysis techniques including simple averaging, Holt's Linear Exponential smoothing, and more can be used to calculate the normal values as before. Threshold deviations from the normal values are set forth in column 532. In the system-based technique of FIG. 9, systems can be identified and reported when their execution time for a transaction is detected as having deviated from its corresponding normal value by the threshold amount or more. Again, deviations above and/or below normal can be used to identify systems, as well as threshold execution times.

Row 534 sets forth the total execution time for each transaction based on the execution time of each system involved in the transaction. A normal transaction time and threshold are set forth in columns 530 and 532 for the overall transaction. In FIG. 9, transaction 3 has exceeded the normal execution time by more than the threshold. The components corresponding to the database server are beyond the database server normal value by more than the corresponding threshold and can be reported as a potential cause of the performance problem associated with transaction 3.

Another set of time series data for a set of transactions is depicted in FIG. 10. The set of transactions depicted in FIG. 10 are similar to the set of transactions in FIG. 9. However, the execution times for each individual system have been grouped together and the raw execution times converted into percentages of total transaction time. Column 550 lists the systems involved in the transactions. Each system's total percentage of transaction time for transactions 1, 2, 3, and 4 is set forth in columns 552, 554, 556, and 558, respectively. For transaction 1, the browser makes up 2.0% of the total transaction time, the network makes up 20.0% of the total transaction time, the web server makes up 3.0% of the total transaction time, the identity server makes up 20.0% of the total transaction time, the application server makes up 15.0% of the total transaction time, the database server makes up 10.0% of the total transaction time, and the messaging server makes up 10.0% of the total execution time. Normal values for each system's total transaction time are set forth in column 560 as a percentage of total transaction time. Threshold deviations from the normal percentage values are listed in column 562. In this embodiment, a system can be identified and reported when its percentage of total execution time for a transaction deviates from the normal for the transaction type by more than the threshold. Again, deviations above and/or below the normal value can be detected in various embodiments. Direct threshold percentages can also be used.

Row 564 sets forth the total execution time for each transaction based on the execution time of each system involved in the transaction. A normal transaction time and threshold are set forth in columns 560 and 562 for the overall transaction.

While percentages are used for the individual component values, actual time values are used for determining if a transaction is beyond a threshold execution time value. In FIG. 10, transactions 3 and 4 have total execution times beyond the threshold. These transactions will be reported. The application server is reported as a possible cause of the performance problem with transaction 3 and the network is reported as a possible cause of the performance problem with transaction 4.

Figure 11:
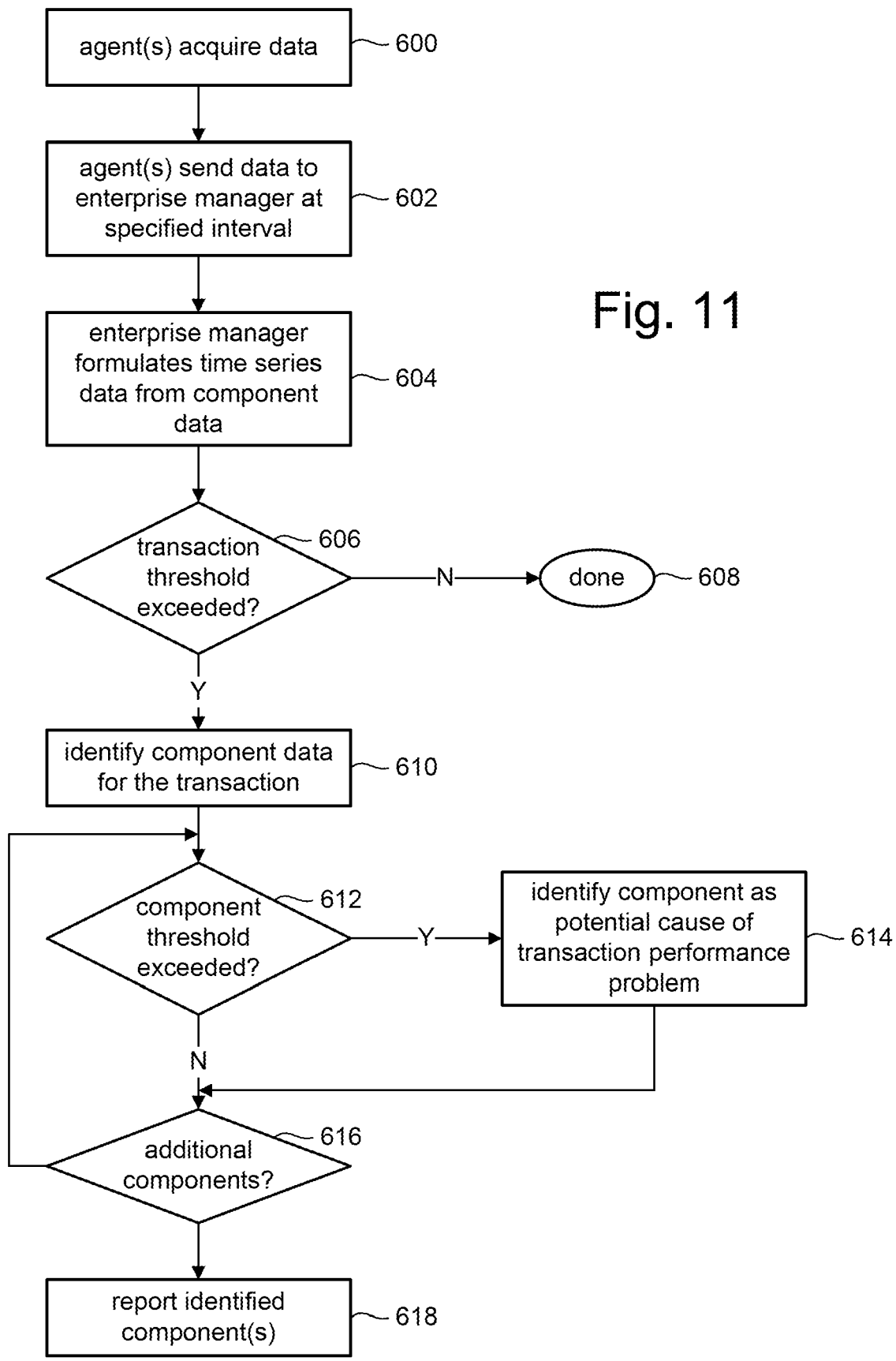
FIG. 11 is a flowchart of a process for collecting and reporting data about transactions in accordance with one embodiment.

FIG. 11 is a flowchart of one embodiment for tracing transactions and providing programmatic root cause analysis of detected performance problems. At step 600, the various agents implemented in the transactional system acquire data. Agents may acquire data directly from transaction components running on the same system. Agents may acquire data from other components, such as browsers, external database servers, etc. by monitoring response times and/or installing code such as Javascript to monitor and report execution times. An agent that initiates tracing, for example, may add a script to a web page to monitor the execution time of a browser in performing a transaction. At step 602, the various agents report data to the enterprise manager.

In one embodiment, the agent(s) continuously acquire data for the various metrics they are monitoring. Thus, step 600 may be performed in parallel to the other steps of FIG. 11. Each agent can be configured to report data to the enterprise manager at step 602. For example, the agents may report data every 7.5 seconds or every 15 seconds. The reported data may be data for one or more transactions. In one embodiment, the agent(s) will sample data for a particular transaction at every interval. In one embodiment, an agent associated with a component that receives an initial request starting a transaction will operate as an entry point agent. The entry point agent can modify the request header (e.g., by adding a flag) to indicate to other agents in the system to report data for the corresponding transaction. When the other agents receive the header with the flag, they will report the monitored data for the corresponding transaction to the enterprise manager 120.

The enterprise manager can be configured to wake-up and process data at a specified interval. For example, the enterprise manager can wake-up every 15 seconds and process the data from the agents reported during two 7.5 second intervals. This data may be appended to a spool file or query file at step 602. More information regarding the collection of data by the agents and processing by the enterprise manager can be found in U.S. patent application Ser. No. 11/033,589, entitled "Efficient Processing of Time Series Data," incorporated herein by reference in its entirety.

The enterprise manager formulates time series data for the various components of the monitored transactions at step 604. The enterprise manager can create a data structure such as those depicted in FIGS. 8, 9, and 10 in one embodiment, although other data structures can be used. The enterprise manager can formulate time series data by task as depicted in FIG. 8, or by system as depicted in FIGS. 9 and 10.

The method depicted in FIG. 11 can be performed for each transaction being monitored. As such, step 604 can include appending component data for the selected transaction to previously collected data. At step 606, the enterprise manager determines if the total transaction time exceeded a threshold. Step 606 can include comparing the total transaction time to a threshold time or determining whether the total time deviated from a normal transaction time by more than a threshold value. If the total transaction time did not exceed the corresponding threshold, tracing for the transaction completes at step 608.

If the total transaction time exceeds the threshold, component data for the transaction data is identified at step 610. The component data can be maintained by individual tasks with which the transactional components are associated as shown in FIG. 8, or by system as shown in FIGS. 9 and 10. At step 612, the enterprise manager determines if a first component of the transaction exceeded the threshold for the associated task or system. The enterprise manager determines if the component execution time deviated from a normal value for the task or system by more than a threshold in one embodiment. In another embodiment, the component execution time (or percentage) is compared to a threshold execution time. If the component has exceeded the relevant threshold, the component is identified as a potential cause of a transaction performance problem at step 614.

After identifying the component or determining that it did not exceed its threshold, the enterprise manager determines at step 616 whether there are additional components of the transaction to analyze. If additional components remain, the method proceeds to step 612 where the enterprise manager examines the execution time of the next component. After analyzing each component of the transaction, the enterprise manager reports the identified components at step 618. Step 618 can include making an indication in the graphical user interface depicted in FIGS. 6 and 7. The identified components can be highlighted in transaction snapshot window 402 for example. Other indications can be used as well.

Figure 12:
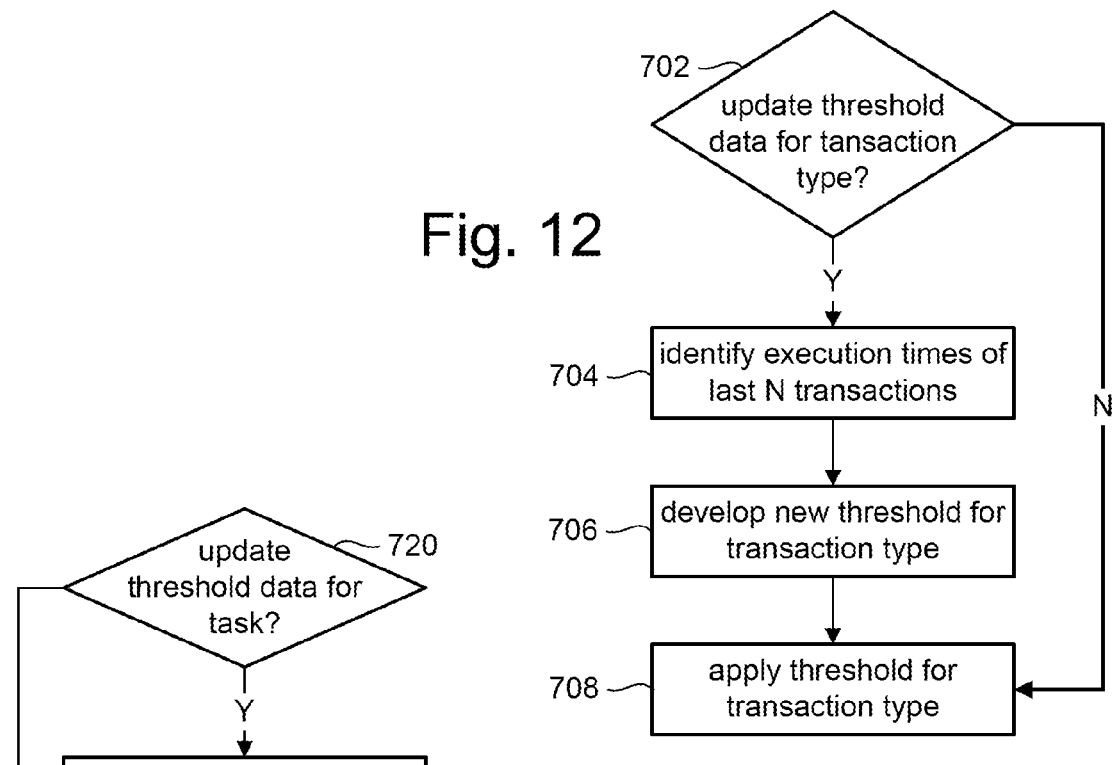
FIG. 12 is a flowchart of a process for dynamically updating threshold and/or normal execution time data for a type of transaction in accordance with one embodiment.

Thresholds for analyzing transaction execution times are dynamically updated using time-series analysis techniques in one embodiment. These analysis techniques can be performed in real-time for each transaction type. FIG. 12 is a flowchart depicting one technique for providing dynamic thresholds in one embodiment. FIG. 12 can be performed as part of step 606 in FIG. 11 in one embodiment. At step 702, the enterprise manager determines if the threshold for the particular type of transaction is to be updated. The enterprise manager may be configured to update the threshold for a particular type of transaction after receiving data for a certain number of transactions of that type. Other techniques may be employed to determine when to update a threshold for a type of transaction. If the threshold is to be updated, the enterprise manager identifies the execution time of the last N transactions for which the manager received data. The actual number of transactions can vary by implementation. A new threshold for the type of transaction is developed at step 706. In one embodiment, step 706 includes determining a normal value for the execution time of the particular type of transaction. The threshold can then be set to a time at a certain level or percentage (variable) above and/or below the normal value. The threshold may also be expressed as a threshold deviation from the normal time (above and/or below). Thus, step 706 can include determining a new normal time for the transaction type and/or a new threshold to be applied. After developing the new threshold and/or normal value for the transaction type, the new values are applied for the particular transaction being analyzed at step 708.

Figure 13:
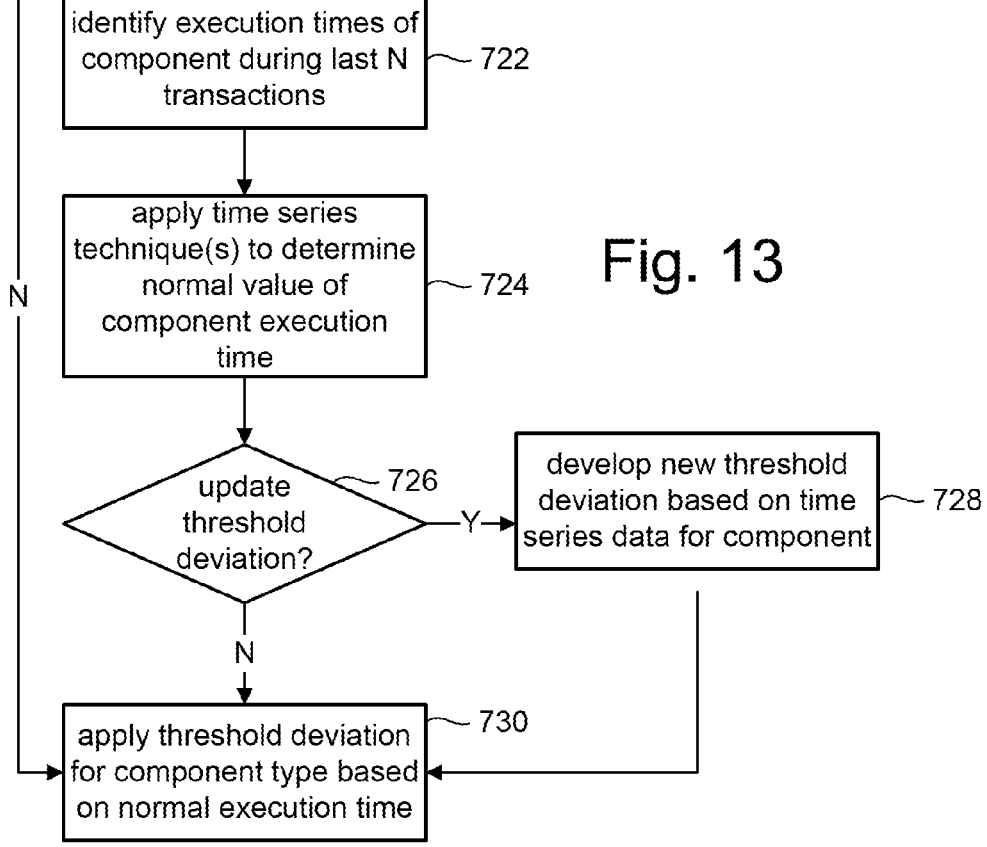
FIG. 13 is a flowchart of a process for dynamically updating threshold and/or normal execution time data for a type of component (task) in accordance with one embodiment.

The thresholds used when analyzing the individual components of transactions can also be updated dynamically. FIG. 13 is a flowchart depicting one method for dynamically updating a threshold for analyzing transactional components as the possible root cause of performance problems. In one embodiment, FIG. 13 is performed at step 614 when analyzing a component execution time for a transaction. At step 720, the enterprise manager determines if the task or system threshold information corresponding to the type of component being analyzed is to be updated. The enterprise manager updates threshold information after receiving data for a particular number of transactions that include a component associated with the particular task and/or system in one embodiment. Other update periods can be used. If the threshold information is not to be updated, the component is analyzed using the existing threshold and/or normal data for the particular task.

If the threshold data is to be updated, the enterprise manager identifies the execution times of components associated with the particular task during the last N transactions at step 722. The number of transactions can vary by embodiment and particularly, on the type of analysis techniques to be employed at step 724. A normal value for the particular task is determined at step 724 using the identified data. In one embodiment, the last N execution times are averaged. In other embodiments, trends and seasonal variations can be identified to predict a new normal value. Holt's Linear Exponential Smoothing is used in one implementation to combine weighted averaging and trend identification in a low-cost way for a real-time update of the normal value. At step 756, the enterprise manager determines whether the threshold for the task is to be updated. In some embodiments, a threshold is used that is expressed as a deviation from normal. This value can remain the same regardless of the normal value determined at step 724. In other embodiments, the threshold deviation is changed as well. If the threshold is to be updated, the enterprise manager updates the necessary value at step 728. A new threshold deviation can be selected or a new threshold execution time selected. At step 730, the new threshold deviation and/or normal execution time is applied to analyze the particular component.

FIG. 14 is a flowchart describing one embodiment of a process for reporting data in the transaction trace table 400. The process of FIG. 14 is performed by a workstation in one embodiment. In step 800, the workstation receives transaction information from enterprise manager 120. In step 802, the data is stored. In step 804, the data is added to the transaction table as a new row on table 400.

FIG. 15 is a flowchart describing one embodiment of a process for displaying a transaction snapshot. In step 820, the GUI receives a selection of a transaction. That is, the user selects one of the rows of transaction trace table 400. Each row of transaction trace table 400 represents data for one particular transaction. The user can select a transaction by clicking on the row. In other embodiments, other means can be used for selecting a particular transaction. In step 822, the data stored for that selected transaction is accessed. In step 824, the axis for the transaction snapshot is set up. In one embodiment, the system renders the time axis along the X axis. For example, in the embodiment depicted in FIG. 6, the time axis is from zero ms to 6000 ms. The zoom slider in snapshot header 404 (see FIG. 6) is used to change the time axis. In some embodiments, configuration files can be used to change the time. In one embodiment, the actual lime representing the axis for call stack position is not rendered. However, the axis is used as described herein. In step 826, the view for the root component is drawn. For example, in transaction snapshot 402, the view for "JSP|Account" is drawn. In step 828, views for each of the components of the root component are drawn. Additionally, the system recursively draws views for each component of each higher level component. For example, looking at FIG. 6, the first root component JSP|Account is drawn. Then, the components of the root component are drawn (e.g., "Servlets|CustomerLookup" is drawn). Then, recursively for each component, a view is drawn. First, a view is drawn for EJB|Entity|Customer, then the components of EJB|Entity|Customer are drawn (e.g. JDBC|Oracle|Query and JDBC|Oracle|Update). After the components for EJB|Entity|Customer are drawn, the view for EJB|Session|Account is drawn, followed by the component JDBC|Oracle|Query.

FIG. 16 is a flowchart describing one embodiment of a process for drawing a view for a particular component. In step 850, the relative start time is determined. In one embodiment, if the view is the root component the start time is at 0ms. If the view is not from the root component, then the timestamp of the start of the component is compared to the timestamp of the start of the root component. The difference between the two timestamps is the start time for the component being rendered. In step 852, the relative stop time is determined. By relative, it is meant relative to the root component. Thus, the stop time is determined for the component being rendered. The stop time of the component being rendered is compared to the stop time of the root component. The difference in the actual stop time of the root component as compared to the actual stop time of the component under consideration is subtracted from the stop time of the root component in the transaction snapshot 402. In step 854, the X values (time axis) of the start and end of the rectangle for the view are determined based on the relative start time, relative stop time, and the zoom factor. Based on knowing the relative start time, the relative stop time, and the extent of the zoom slider, the exact coordinate of the beginning of the rectangle and the end of the rectangle can be determined. In step 856, the Y values (call stack position axis) of the top and bottom of the rectangle are determined based on the level of the component. That is, the Y values of all of the rectangles are predetermined based on whether it is the root component, the first component thereof, second subcomponent, third subcomponent, etc. In step 858, the view is added to the transaction snapshot. In step 860, an additional view box for the calling component is also added. The calling component is a component that invokes the component being drawn. For example, in the transaction snapshot of 402, the calling component of Servlets|CustomerLookup is JSP|Account. At step 862, the view for the component in transaction snapshot 402 is highlighted if the component data indicates that the component exceeded its relevant threshold. Step 862 is optional. In other embodiments, different indications can be made in transaction snapshot 402 for components that exceed a threshold during the transaction.

FIG. 17 is a flowchart describing one embodiment of a process for reporting detailed information about a component of the transaction. That is, when the user selects one of the components in transaction snapshot 402, detailed information is provided for that component in component information region 408, analysis region 410 and properties region 412. In step 870, the GUI receives the user's selection of a component. In step 872, the stored data for the chosen component is accessed. In step 874, the appropriate information is added to component information region 408. That is, the stored data is accessed and information indicating the type of component, the name of the component, and the path to the component are accessed and reported. Each of these data values are depicted in component information region 408. In step 876, data is added to the analysis region 410. That is, system accesses the stored duration (or calculates the duration), the timestamp, the start of the component relative to the start of the root component, and determines the percentage of transaction time used by that component. These values are displayed in the analysis region 410. The percentage of transaction times is calculated by dividing the duration of the selected component by the duration of the root component and multiplying by 100%. Step 876 can include providing an indication if the component exceeded its relevant threshold. In step 878, data is added to the properties region. In one embodiment, the properties region will display the method invoked for the component. In other embodiments, other additional parameters can also be displayed. In one embodiment, regions 408, 410, and 412 are configurable to the display whatever the user configures it to display.

The user interface of FIG. 8 also includes a set of drop down menus. One of these menus can be used to allow the user to request a text file to be created. In response to the request by the user, the system will write all (or a configurable subset) of the information that is and/or can be displayed by the graphical user interface into a text file. For example, a text file can include the category, component name, timestamp, duration, percentage of the transaction time, URL, userID, host, process, agent, all of the called subcomponents and similar data for the called subcomponents. Any and all of the data described above can be added to the text file.

The above discussion contemplates that the filter used by the agent to determine whether to report a transaction is based on execution time. In other embodiments, other tests can be used. Examples of other tests include choosing based on UserID, provide a random sample, report any transaction whose execution time varies by a standard deviation, etc.

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method of monitoring software, comprising:
    monitoring sets of code as they are executed;
    collecting data about a set of transactions corresponding to the sets of code during execution, each transaction including a plurality of components associated with a plurality of component types, the data including time series data for each component type based on data corresponding to the plurality of components of the each transaction;
    determining a component threshold for the each component type dynamically based on execution times of the plurality of components of the each transaction during monitoring;
    determining whether transactions have execution times beyond a transaction threshold;
    for each transaction having an execution time beyond the transaction threshold, determining whether the time series data for each component is outside a component threshold for a corresponding component type; and
    automatically reporting the each transaction having an execution time beyond the transaction threshold and automatically reporting the each component for said each transaction that has the time series data that is outside the component threshold for the corresponding component type.

2. A computer-implemented method according to claim 1, further comprising:
    determining a normal execution time for the each component type dynamically based on the execution times of the plurality of components of the each transaction during monitoring;
    wherein the threshold for the each component type is a threshold deviation from the normal execution time.

3. A computer-implemented method according to claim 1, further comprising:
    automatically modifying the sets of code to add additional code for enabling the monitoring of the sets of code.

4. A computer-implemented method according to claim 3, wherein:
    automatically modifying the sets of code includes instrumenting bytecode to add at least one probe to each set of code.

5. A computer-implemented method according to claim 1, wherein collecting time series data includes, for each transaction:
    determining a total execution time;
    determining an execution time of the each component of the each transaction; and
    developing the time series data for the each component type based on the execution times of each corresponding component.

6. A computer-implemented method according to claim 5, further comprising:
    determining a normal execution time of the each component type based on the execution times of each corresponding component;
    wherein determining whether the time series data for the each component is outside the component threshold for the corresponding component type includes determining whether a deviation in times series data for each of the components exceeds a threshold deviation from the normal execution time for the each component type.

7. A computer-implemented method according to claim 1, further comprising:
    graphically displaying every component of the each transaction having an execution time beyond the transaction threshold; and
    highlighting a graphical display of each component having an execution time beyond its corresponding component threshold.

8. A computer-implemented method according to claim 1, wherein:
    the each transaction corresponds to execution of the sets of code; and
    each component of a transaction corresponds to an instantiation of one set of code.

9. One or more processor readable storage devices according to claim 1, wherein the method further comprises:
    automatically modifying the sets of code to add additional code for enabling monitoring of the sets of code.

10. One or more processor readable storage devices according to claim 9, wherein:
    automatically modifying the sets of code includes instrumenting bytecode to add at least one probe to each set of code.

11. One or more processor readable storage devices having processor readable code embodied on the processor readable storage devices, the processor readable code for programming one or more processors to perform a method comprising:
    monitoring sets of code as they are executed;
    collecting data about a set of transactions corresponding to the sets of code during execution, each transaction including a plurality of components associated with a plurality of component types, the data including time series data for each component type based on data corresponding to the plurality of components of the each transaction;

determining a component threshold for the each component type dynamically based on execution times of the plurality of components of the each transaction during monitoring;

determining whether transactions have execution times beyond a transaction threshold;

for each transaction having an execution time beyond the transaction threshold, determining whether the time series data for each component is outside a component threshold for a corresponding component type; and automatically reporting the each transaction having an execution time beyond the transaction threshold and automatically reporting the each component for said each transaction that has the time series data that is outside the component threshold for the corresponding component type.

12. One or more processor readable storage devices according to claim 11, wherein the method further comprises:

determining a normal execution time for the each component type dynamically based on the execution times of the plurality of components of the each transaction during monitoring;

wherein the threshold for the each component type is a threshold deviation from the normal execution time.

13. One or more processor readable storage devices according to claim 11, wherein the method further comprises:

graphically displaying every component of the each transaction having an execution time beyond the transaction threshold; and highlighting a graphical display of each component having an execution time beyond its corresponding component threshold.

14. A computer-implemented method of monitoring software execution, comprising:

monitoring sets of code as they are executed;

collecting data about a set of transactions corresponding to the sets of code during execution, each transaction including a plurality of components associated with a plurality of component types, the data including time series data for each component type based on execution times corresponding to the plurality of components of each transaction;

dynamically determining a component threshold for the each component type using the time series data for the each component type while monitoring the sets of code;

comparing an execution time of the each component of the each transaction with the component threshold for a corresponding component type;

identifying components having an execution time beyond the component threshold for their corresponding component type; and automatically identifying and reporting components having an execution time beyond the component threshold for their corresponding component type.

15. A computer-implemented method according to claim 14, further comprising:

automatically modifying the sets of code to add additional code for enabling monitoring of said sets of code.

16. A computer-implemented method according to claim 15, wherein:

automatically modifying the sets of code includes instrumenting sets of bytecode to add at least one probe to each set of code.

17. A computer-implemented method according to claim 14, wherein:

dynamically determining the component threshold for the each component type includes applying Holt's linear exponential smoothing to the time series data for the each component type.

18. A computer-implemented method according to claim 14, wherein:

the method further comprises dynamically determining a normal execution time for the each component type; and comparing the execution time of the each component of the each transaction with the component threshold for the corresponding component type includes determining whether the execution time of said each component deviates from the normal execution time for the corresponding component type by more than the component threshold for the corresponding component type.

* * * * *